(12) United States Patent
Suh et al.

(10) Patent No.: US 7,695,178 B2
(45) Date of Patent: Apr. 13, 2010

(54) LIGHT-GUIDE PLATE, BACKLIGHT ASSEMBLY AND LIQUID CRYSTAL DISPLAY HAVING THE SAME

(75) Inventors: Chung-Woo Suh, Gwacheon-si (KR); Sang-Min Yi, Suwon-si (KR); Jae-Lok Cha, Goyang-si (KR); Sang-Hee Lee, Yongin-si (KR); Kyoung-Don Lee, Suwon-si (KR); Jae-Kwang Kim, Seoul (KR); In-Hyuk Choi, Seoul (KR); Wal-Hee Kim, Yongin-si (KR); Hwan-Jin Kim, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 193 days.

(21) Appl. No.: 11/472,817

(22) Filed: Jun. 22, 2006

(65) Prior Publication Data

US 2007/0035842 A1 Feb. 15, 2007

(30) Foreign Application Priority Data

Jun. 23, 2005 (KR) ........................ 10-2005-0054301
Jan. 2, 2006 (KR) ........................ 10-2006-0000105

(51) Int. Cl.
*F21V 7/04* (2006.01)
(52) U.S. Cl. .................. 362/612; 362/628; 362/632; 362/633
(58) Field of Classification Search .............. 362/612, 362/608, 621, 600, 613, 615, 628, 631, 632, 362/633, 634, 800
See application file for complete search history.

(56) References Cited

U.S. PATENT DOCUMENTS

| | | | | |
|---|---|---|---|---|
| 3,491,245 A | * | 1/1970 | Hardesty | 250/227.11 |
| 4,573,766 A | * | 3/1986 | Bournay et al. | 349/65 |
| 4,714,983 A | * | 12/1987 | Lang | 362/27 |
| 5,375,043 A | * | 12/1994 | Tokunaga | 362/601 |
| 5,618,096 A | * | 4/1997 | Parker et al. | 362/629 |
| 5,786,665 A | * | 7/1998 | Ohtsuki et al. | 313/512 |
| 6,626,550 B2 | * | 9/2003 | Choi | 362/632 |
| 6,700,633 B2 | | 3/2004 | Cho | |
| 6,992,736 B2 | * | 1/2006 | Saito et al. | 349/58 |
| 7,445,371 B2 | * | 11/2008 | Ma et al. | 362/633 |
| 2003/0164903 A1 | | 9/2003 | Saito et al. | |
| 2003/0201702 A1 | * | 10/2003 | Kim et al. | 313/110 |

(Continued)

FOREIGN PATENT DOCUMENTS

CN 1564066 1/2005

(Continued)

*Primary Examiner*—John A Ward
(74) *Attorney, Agent, or Firm*—F. Chau & Assocites, LLC

(57) ABSTRACT

A light-guide plate includes a body for guiding incident light, and at least an inserting portion penetrating a portion of the body, wherein at least a light source for providing the light-guide plate with the light is inserted into the inserting portion. The inserting portion can be formed at an end portion of the body. A side surface of the body can be recessed to form the inserting portion. A light-diffusing pattern can be formed at a side surface of the inserting portion, and the side surface of the inserting portion is substantially parallel with the side surface of the body.

16 Claims, 7 Drawing Sheets

U.S. PATENT DOCUMENTS

| | | | |
|---|---|---|---|
| 2004/0141305 A1* | 7/2004 | Higashiyama | 362/31 |
| 2005/0001952 A1* | 1/2005 | Han et al. | 349/65 |
| 2006/0158901 A1* | 7/2006 | Wang | 362/612 |

FOREIGN PATENT DOCUMENTS

| | | |
|---|---|---|
| JP | 2001-143517 | 5/2001 |
| JP | 2002-108257 | 4/2002 |
| JP | 2004-177876 | 6/2004 |
| JP | 2004-213943 | 7/2004 |
| JP | 2004-241237 | 8/2004 |
| JP | 2005-026222 | 1/2005 |
| JP | 2005-038776 | 2/2005 |
| JP | 2005-043756 | 2/2005 |
| KR | 1998-0041095 | 8/1998 |
| KR | 1020010007011 | 1/2001 |
| KR | 1020020076687 | 10/2002 |
| KR | 1020030010289 | 2/2003 |
| KR | 1020040019202 | 3/2004 |
| KR | 1020050025905 | 3/2005 |

* cited by examiner

LIGHT-GUIDE PLATE, BACKLIGHT ASSEMBLY AND LIQUID CRYSTAL DISPLAY HAVING THE SAME

CROSS-REFERENCE TO RELATED APPLICATIONS

This application claims priority to Korean Patent Application No. 2005-54301 filed on Jun. 23, 2005 and Korean Patent Application No. 2006-00105 filed on Jan. 2, 2006, the contents of which are incorporated by reference in their entireties herein.

BACKGROUND OF THE INVENTION

1. Technical Field

The present disclosure relates to a light-guide plate, a backlight assembly, and a liquid crystal display (LCD) device having the same, and more particularly, to a light-guide plate capable of improving brightness, and a backlight assembly and an LCD device having the light-guide plate.

2. Discussion of the Related Art

A liquid crystal display (LCD) device is thinner and lighter, and consumes less driving voltage and less power as compared to other display devices. Therefore, the LCD device is widely used in devices such as, for example, notebook computers or cellular phones.

The LCD device may include a backlight assembly providing an LCD panel with light because the LCD panel is not self-emissive. The backlight assembly includes a light source providing light and an optical member improving brightness of light provided from the light source. A cold cathode fluorescent lamp (CCFL) and a light-emitting diode (LED) can be used as the light source. For example, a medium- or small-sized LCD device such as a cellular phone includes an LED having high brightness. The LCD device includes a light-guide plate for guiding light that is provided from the light source toward the LCD panel.

The LED is a point light source having a smaller range of emitting area than that of the CCFL. The point light emitted from the LED enters the light-guide plate through a side surface of the light-guide plate, so that the light-guide plate changes the point light into surface light and provides the LCD panel with planar light.

The LCD device includes a printed circuit film on which a circuit pattern for driving the LED is formed, and the LED is attached to the printed circuit film. The LED attached to the printed circuit film is disposed at a side surface of the light-guide plate.

In a conventional technology, a gap between the LED and the light-guide plate is designed so that the light provided from the LED does not leak from the light-guide plate. However, the gap between the LED and the light-guide plate may be larger than the initially designed configuration because of, for example, the manufacturing tolerance of the light-guide plate or a receiving container receiving the light-guide plate and the LED. Therefore, a portion of the light provided from the LED is not transmitted to the light-guide plate, and leaks from the light-guide plate.

Accordingly, optical efficiency and driving efficiency of the backlight assembly having the LED, and display quality of an LCD device having the backlight assembly can be deteriorated.

SUMMARY OF THE INVENTION

Embodiments of the present invention provide a light-guide plate to improve brightness properties, a backlight assembly having the light-guide plate, and a liquid crystal display (LCD) device having the backlight assembly with the light guide-plate to improve display quality.

According to an embodiment of the present invention, a light-guide plate includes a body for guiding incident light and an inserting portion penetrating a portion of the body. A light source that provides the light-guide plate with the light can be inserted into the inserting portion.

The inserting portion may be formed at an end portion of the body. A side surface of the body may be recessed so as to form the inserting portion. A light-diffusing pattern may be formed at a side surface of the inserting portion, and the side surface of the inserting portion is substantially parallel with the side surface of the body.

The light-guide plate may comprise a plurality of inserting portions and a number of the inserting portions can be the same as the number of the light sources.

According to an embodiment of the present invention, a backlight assembly includes a light source part producing light, a printed circuit board (PCB) providing a driving signal with the light source part to drive the light source part, and a light-guide plate including a body and an inserting portion. The light source part can be attached to the PCB. The light source part is inserted into the inserting portion of the light-guide plate, so that the light source part is fixed to the light-guide plate.

The inserting portion of the light-guide plate may penetrate a portion of the body of the light-guide plate.

A side surface of the body of the light-guide plate may be recessed to form the inserting portion of the light-guide plate. A light-diffusing pattern may be formed at a side surface of the inserting portion, and the side surface of the inserting portion is substantially parallel with the side surface of the body.

The light source part may include a plurality of light emitting diodes (LEDs). The inserting portion of the light-guide plate may have a shape and size corresponding to the light source part. The light source part is inserted into and fixed to the light-guide plate, such that the PCB is fixed to the light-guide plate.

The backlight assembly may further include a reflecting plate disposed under the light-guide plate to reflect light leaking from the light-guide plate. The backlight assembly may further include an optical member disposed over the light-guide plate to improve brightness properties of light exiting from the light-guide plate.

According to an embodiment of the present invention, an LCD device includes an LCD panel displaying an image, a light source part producing light, a PCB providing a driving signal with the light source part to drive the light source part, and a light-guide plate including a body and an inserting portion, wherein the light source part is inserted into the inserting portion of the light-guide plate, so that the light source part is fixed to the light-guide plate.

The light source part may include a plurality of LEDs.

The inserting portion of the light-guide plate may have a shape and size corresponding to the light source part.

The light source part is inserted into and fixed to the light-guide plate, such that the PCB is fixed to the light-guide plate.

The LCD device may further include a receiving container receiving the light-guide plate and the LCD panel. The light-guide plate may further include a fixing member, and the receiving container may further include a fixing groove into which the fixing member is inserted. The LCD device may further include a top chassis combined with the receiving container to prevent the LCD panel from being separated from an upper part of the light-guide plate.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENTS

Figure 1:
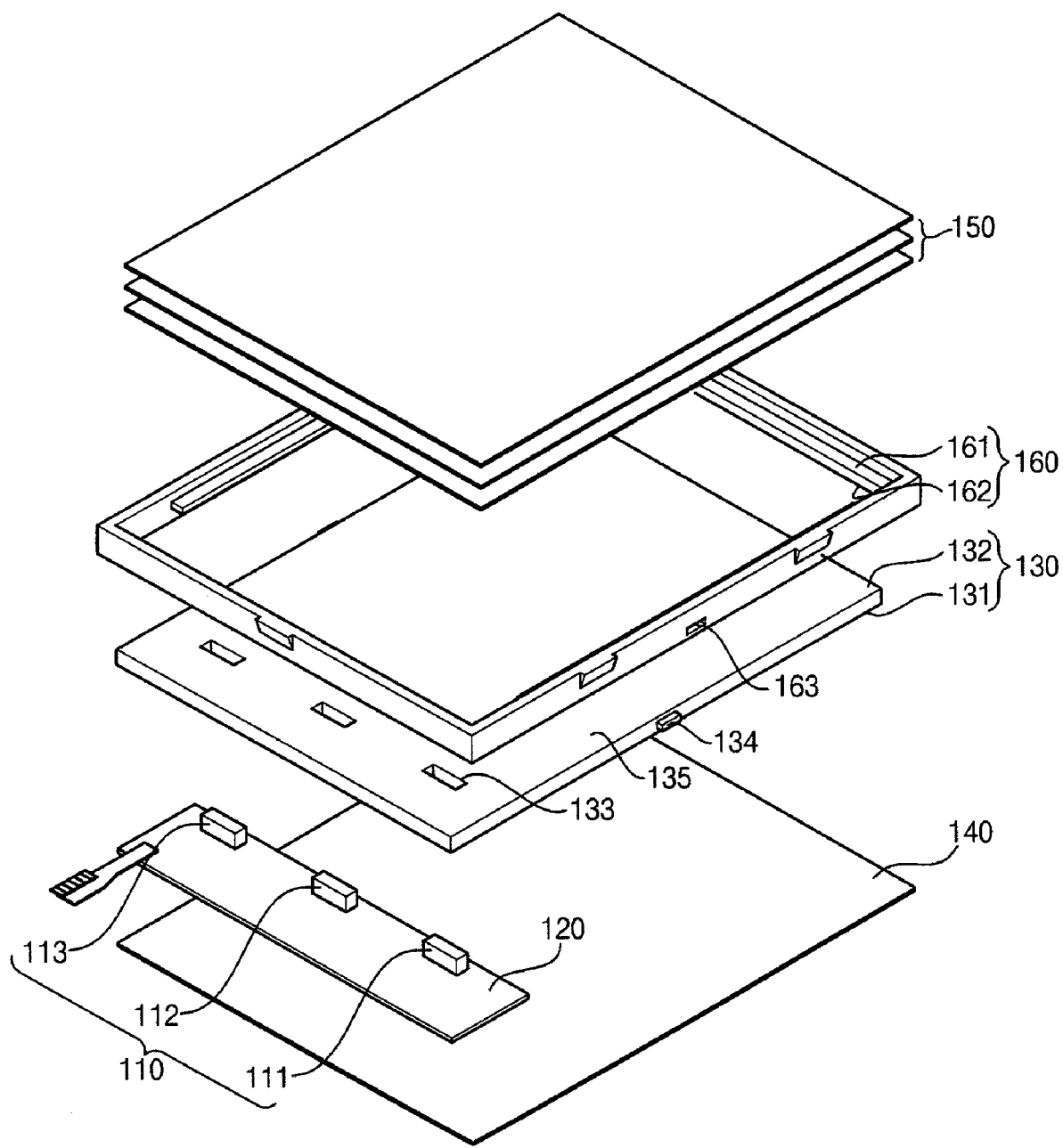
FIG. 1 is an exploded perspective view illustrating a backlight assembly according to an embodiment of the present invention.

Exemplary embodiments of the present invention will be described below in more detail with reference to the accompanying drawings. This invention may, however, be embodied in many different forms and should not be construed as limited to the embodiments set forth herein. FIG. 1 is an exploded perspective view illustrating a backlight assembly according to an embodiment of the present invention.

Referring to FIG. 1, a backlight assembly 100 includes a light source part 110, a printed circuit board (PCB) 120, a light-guide plate 130, a reflecting plate 140 and a plurality of optical sheets 150.

The backlight assembly 100 further includes a first receiving container 160 receiving the light source part 110, the PCB 120, the light-guide plate 130, the reflecting plate 140, and the optical sheets 150.

The light source part 110 emits light having a predetermined brightness and provides the light-guide plate 130 with the light. The light source part 110 includes a plurality of light emitting diodes (LEDs) 111, 112 and 113. The LEDs 111, 112 and 113 are inserted into the light-guide plate 130, and are fastened to the light-guide plate 130.

Referring to FIGS. 2 through 5, the light source part 110 is attached to the PCB 120, for example, by a soldering process, and a circuit pattern (not shown) providing a driving signal for driving the light source part 110 is formed at the PCB 120.

The light source part 110 is inserted into and is fixed to the light-guide plate 130, so that the PCB 120 having the attached light source part 110 is disposed at a first surface 131 of the light-guide plate 130. Alternatively, the PCB 120 having the attached light source part 110 may be disposed at a second surface 132 of the light-guide plate 130.

The light-guide plate 130 includes, for example, polymethyl methacrylate (PMMA) or polycarbonate (PC).

The light-guide plate 130 changes a path of light provided from the light source part 110 disposed at a side of the light-guide plate 130, and emits the light toward the second surface 132 of the light-guide plate 130. A light-guide pattern (not shown) for guiding light may be formed at the light-guide plate 130. Accordingly, the light-guide plate 130 changes point light exiting from emitting diodes into planar light.

A plurality of inserting portions 133 are formed at the light-guide plate 130. The plurality of inserting portions 133 receive the light source part 110.

The reflecting plate 140 is disposed under the light-guide plate 130, and faces the first surface 131 of the light-guide plate 130. The reflecting plate 140 reflects light leaking downward from the light-guide plate 130 to the light-guide plate 130 to improve optical efficiency.

The reflecting plate 140 having a predetermined thickness can be employed in an embodiment described in connection with FIG. 1. In another embodiment of the present invention, a reflecting sheet having a form of a thin sheet may be employed instead of the reflecting plate 140.

The optical sheets 150 improve brightness of the light exiting from the light-guide plate 130. The optical sheets 150 include, for example, a polarizing sheet, a prism sheet, and a diffusing sheet.

The first receiving container 160 includes a first receiving surface 161 and a second receiving surface 162. The second receiving surface 162 corresponds to a rear surface of the first receiving surface 161.

The first receiving surface 161 receives the optical sheets 150 and a liquid crystal display (LCD) panel (not shown). The second receiving surface 162 receives the light-guide plate 130, the light source part 110, the PCB 120, and the reflecting plate 140. The inserting portions 133 receive the light source part 110. The light source part 110 is attached to the PCB 120.

The LCD panel (not shown) is disposed over the backlight assembly 100, and displays an image by using the light exiting from the backlight assembly 100.

In an embodiment of the present invention, the first receiving container 160 receives the LCD panel (not shown) on the first receiving surface 161 of the first receiving container 160. The first receiving container 160 receives the light-guide plate 130 on the second receiving surface 162.

In another embodiment of the present invention, the light-guide plate 130 may be disposed on the first receiving surface 161 and the LCD panel (not shown) may be disposed over the light-guide plate 130. In other words, the light-guide plate 130 and the LCD panel (not shown) may be successively disposed on the same receiving surface.

The light-guide plate 130 may further include a fixing member 134 to fix the light-guide plate 130 more firmly and to prevent the light-guide plate 130 from being detached from the first receiving container 160 caused by, for example, a shifting.

The first receiving container 160 may further include a fixing groove 163 for receiving the fixing member 134.

The fixing member 134 may have a shape protruding from a side of the light-guide plate 130. The light-guide plate 130 may also include a plurality of fixing members 134 that are disposed at predetermined portions of the side of the light-guide plate 130.

For example, the fixing member 134 may be formed at all of the four sides of the light-guide plate 130 according to an embodiment of the present invention. The fixing member 134 may be formed at one side or two opposite sides of the light-guide plate 130 according to another embodiment of the present invention. A plurality of fixing grooves 163 for receiving the fixing member 134 can be formed at the first receiving container 160. The number of the fixing grooves 163 can be same as the number of the fixing members 134.

Figure 2:
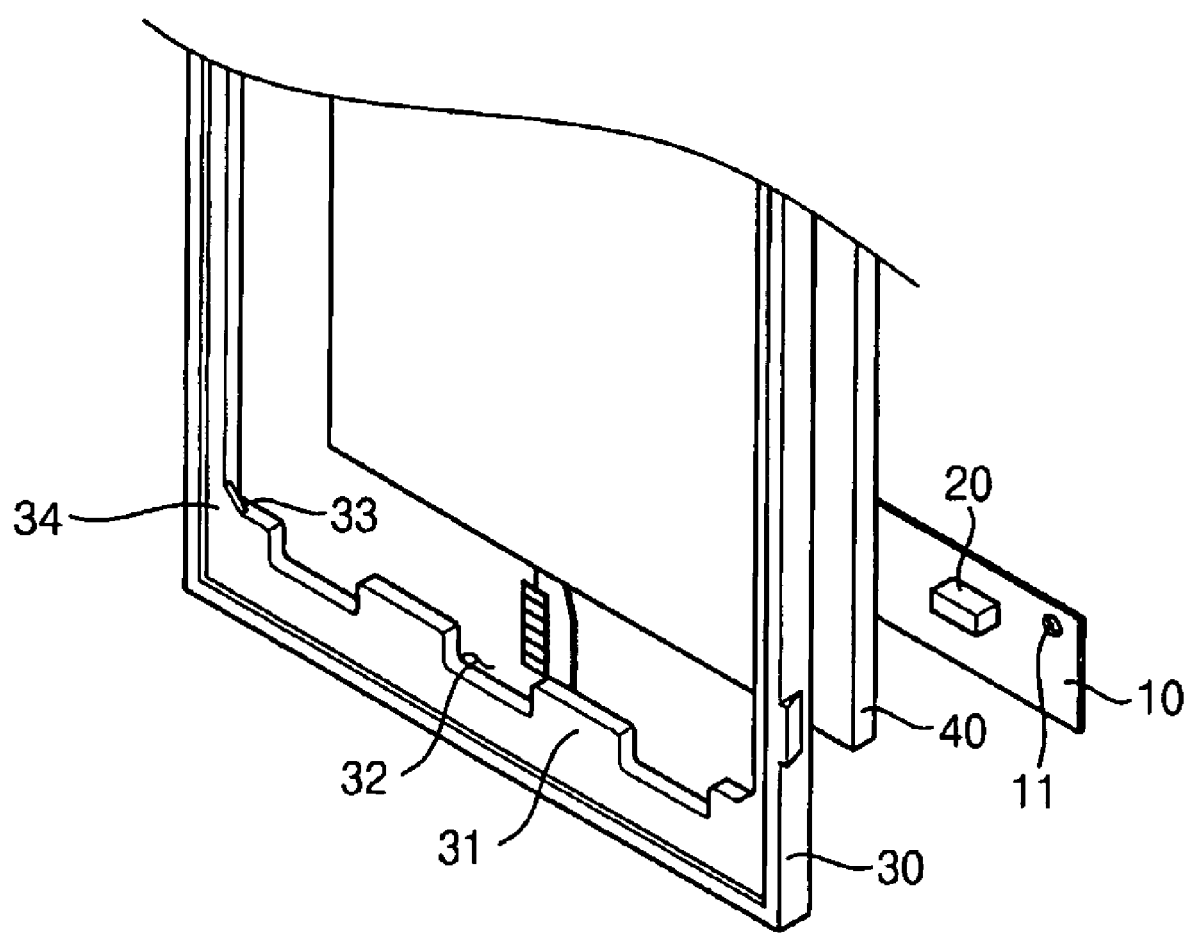
FIG. 2 is an exploded perspective view illustrating a portion of a backlight assembly according to a comparative example.
Figure 3:
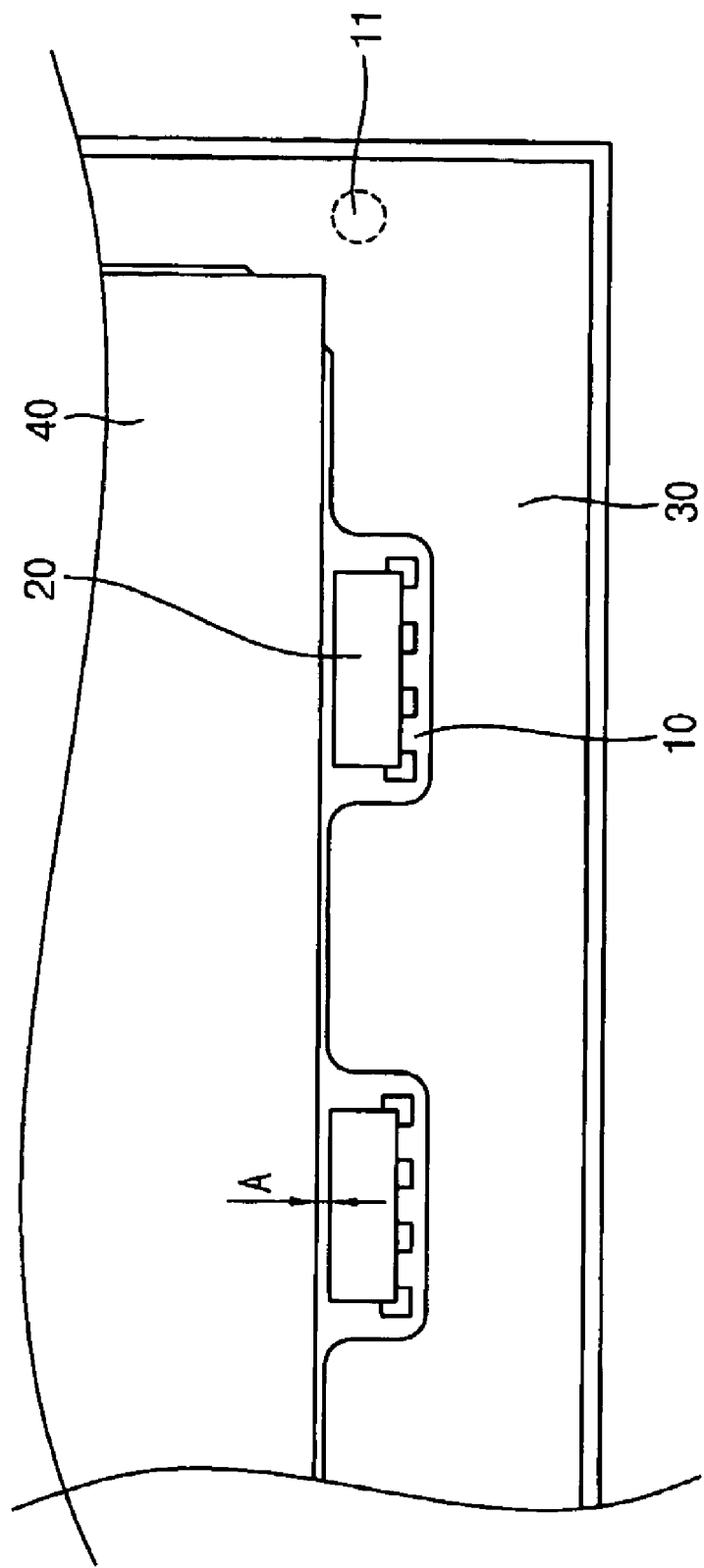
FIG. 3 is a front view illustrating the backlight assembly of FIG. 2 in a combined state.

FIG. 2 is an exploded perspective view illustrating a portion of a backlight assembly according to a comparative example. FIG. 3 is a front view illustrating the backlight assembly of FIG. 2 in a combined state. In, FIG. 3, a light source part 20, a light-guide plate 40 and a first receiving container 30 are assembled.

Referring to FIG. 2 and FIG. 3, an LCD device includes a PCB 10, and a light source part 20 is attached to the PCB 10. The light source part 20 includes, for example, a plurality of diodes.

A first receiving container 30 includes a plurality of protruding portions 31 and a plurality of recessed portions 32 that are formed at an inside surface of the first receiving container 30. The protruding portions 31 protrude toward an inside of the first receiving container 30, and the recessed portions 32 are formed between the protruding portions 31.

The first receiving container 30 receives a light-guide plate 40 at a first receiving surface 33 so that the light-guide plate 40 faces the protruding portions 31 of the first receiving container 30.

The light source part 20 is attached to the PCB 10. The PCB 10 is disposed so that the diodes of the light source part 20 can be inserted into the recessed portions 32. The PCB 10 is disposed to overlap a portion of the light-guide plate 40, thus a gap between the light source part 20 and the light-guide plate 40 may be reduced.

The PCB 10 may further include a combining portion 11 that prevents the PCB 10 from shifting, thereby uniformly maintaining the position of the light source part 20. The first receiving container 30 may further include a guide portion (not shown) for receiving the combining portion 11 to prevent the PCB 10 from shifting.

When the light source part 20 and the light-guide plate 40 are disposed described in connection with FIG. 2, manufacturing tolerance of, for example, the PCB 10, the first receiving container 30 or the light-guide plate 40 causes a gap 'A' between the light source part 20 and the light-guide plate 40. The gap 'A' can be about 0.3 mm to about 0.5 mm.

A positional error that may occur during a process of soldering the light source part 20 to the PCB 10 may further enlarge the gap 'A' between the light source part 20 and the light-guide plate 40.

Due to the gap 'A' between the light source part 20 and the light-guide plate 40, the light provided from the light source part 20 leaks, such that an optical efficiency of the backlight assembly 100 deteriorates and a brightness deviation of the backlight assembly 100 occurs. Accordingly, a quality of an image that the LCD device displays deteriorates.

Figure 4:
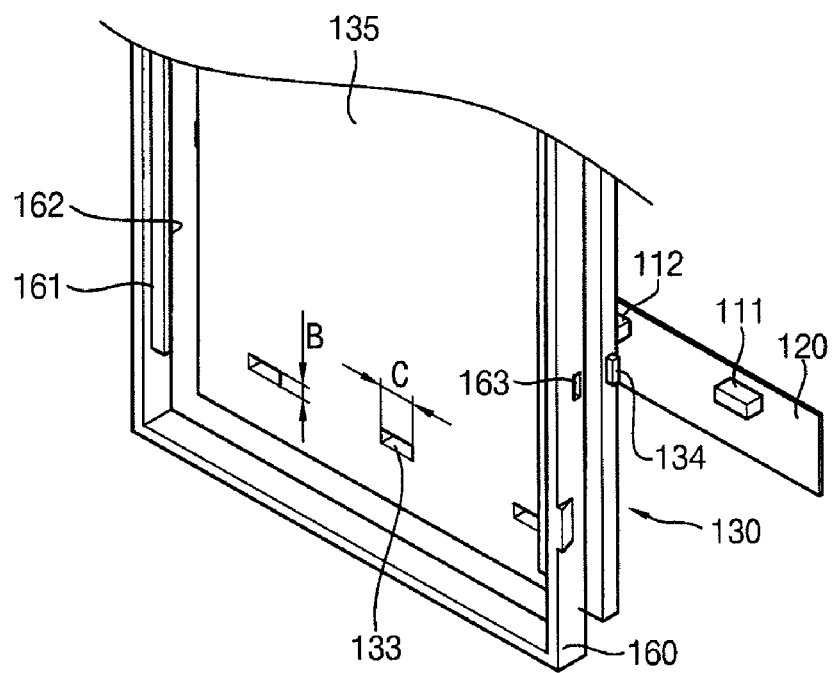
FIG. 4 is an exploded perspective view illustrating a portion of the backlight assembly according to an embodiment of the present invention.
Figure 5:
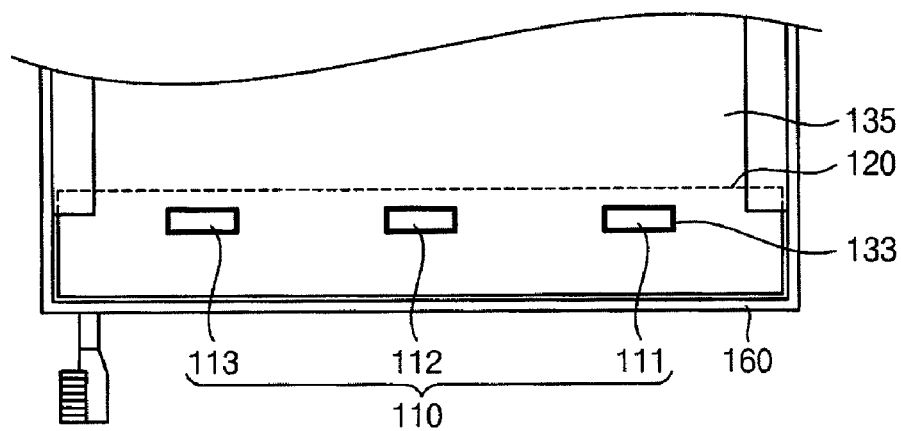
FIG. 5 is a front view illustrating a portion of a backlight assembly according to an embodiment of the present invention.

FIG. 4 is an exploded perspective view illustrating a portion of a backlight assembly shown in FIG. 1 according to an embodiment of the present invention. FIG. 5 is a front view of a portion of a backlight assembly shown in FIG. 4, in a combined state, according to an embodiment of the present invention. In FIG. 5, a light source part 110, a light-guide plate 130 and a first receiving container 160 are assembled.

Referring to FIGS. 1, 4 and 5, a backlight assembly 100 according to an embodiment of the present invention includes the light-guide plate 130 having the inserting portions 133. The inserting portions 133 are formed at a body 135 of the light-guide plate 130 during a process of manufacturing the light-guide plate 130. Each of the inserting portions 133 has substantially the same size and shape as that of an LED of the light source part 110 used in the backlight assembly 100.

Herein, the term "body" represents a portion of the light-guide plate 130 in which the inserting portions 133 are not formed.

The inserting portions 133 can be formed as many as the number of diodes of the light source part 110. In other words, the inserting portions 133 and the diodes of the light source part 110 have the same number according to an embodiment of the present invention.

In an embodiment of the present invention, each of the inserting portions 133 may be formed as a hole penetrating a first surface 131 and a second surface 132 of the light-guide plate 130. A width of each of the inserting portions 133 may be substantially the same as a width of the corresponding LED of the light source part 110.

For example, when each of cross sections of the LEDs 111, 112 and 113 is rectangle, each of the inserting portions 133 may have a first width 'B' that is substantially the same as a distance between both longer sides of each of the LEDs 111, 112 and 113. Each of the inserting portions 133 may have a second width 'C' that is substantially the same as a distance between both shorter sides of each of the LEDs 111, 112 and 113.

The light source part 110 may be supported by the inserting portions 133 and fixed to the light-guide plate 130, because the first width 'B' is substantially the same as the distance between both longer sides of the corresponding LEDs 111, 112 and 113, or the second width 'C' is substantially the same as the distance between both shorter sides of the corresponding LEDs 111, 112 and 113.

In an embodiment, each of the inserting portions 133 has a width 'B' that is substantially the same as a distance between both longer sides of corresponding LEDs 111, 112 and 113 so that the LEDs 111, 112 and 113 are fixed to the light-guide plate 130.

The light source part 110 is attached to the PCB 120, for example, by a soldering process. The light source part 110 is inserted into and is fixed to the light-guide plate 130, such that the PCB 120 is disposed at a side portion of the first surface 131 of the light-guide plate 130.

A first receiving container 160 receives the light-guide plate 130 at a first receiving surface 161 with the PCB 120 disposed at the side portion of the first surface 131 of the light-guide plate 130, and with the light source part 110 attached to the PCB 120.

According to an embodiment of the present invention, the gap 'A' between the light source part 20 and the light-guide plate 40 in FIG. 3 may not appear because the light source part 110 is fixed to light-guide plate 130. Therefore, the entire portion of light provided from the light source part 110 may be transmitted into the light-guide plate 130 without leaking, so that the optical efficiency may be improved.

In an embodiment of the present invention, shifting of the light source part 110 may be prevented and a deviation of brightness caused by shifting of the light source part 110 may be also prevented, so that brightness properties of the backlight assembly 100 may be improved.

Figure 6:
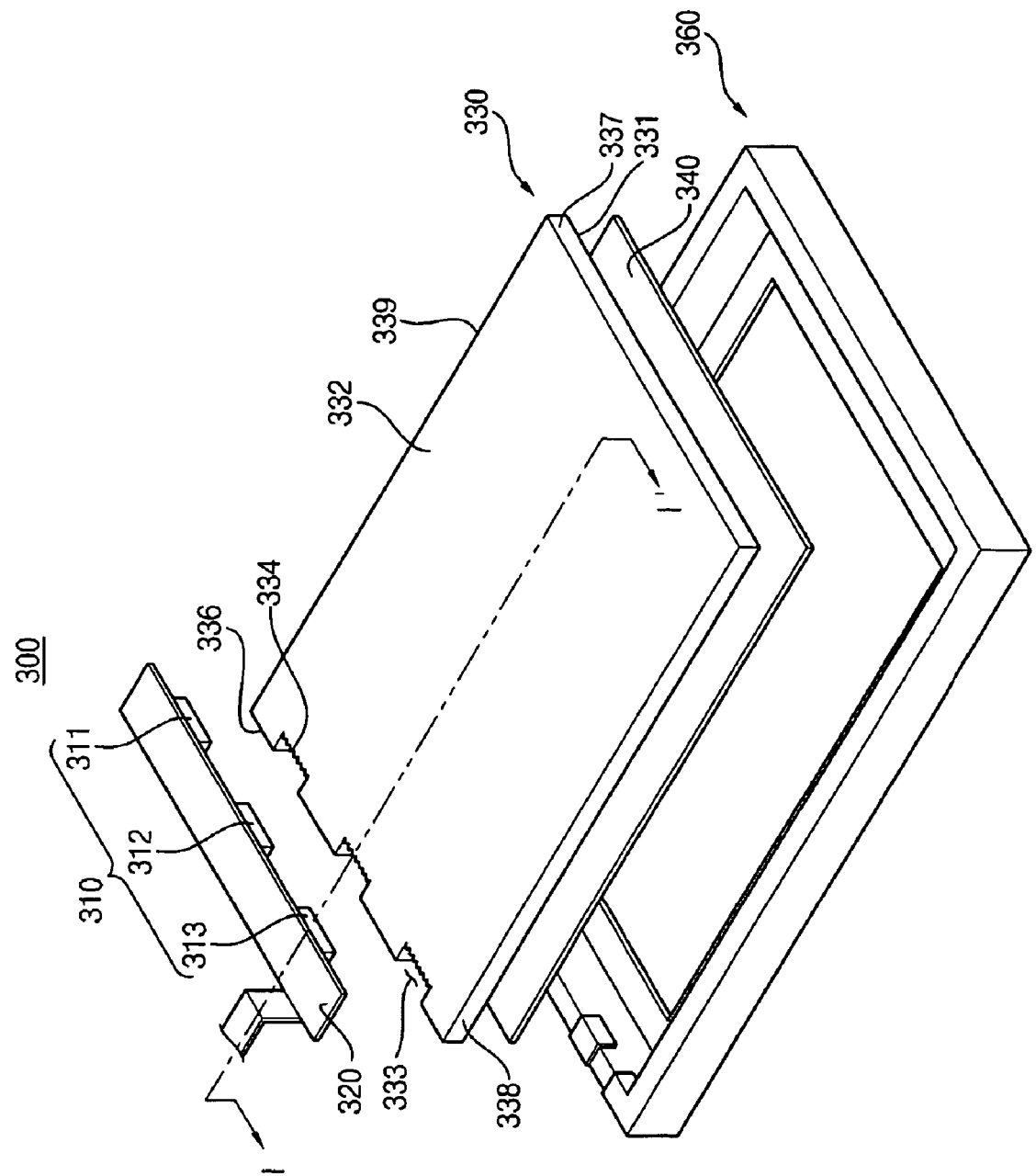
FIG. 6 is an exploded perspective view illustrating a backlight assembly according to an embodiment of the present invention.
Figure 7:
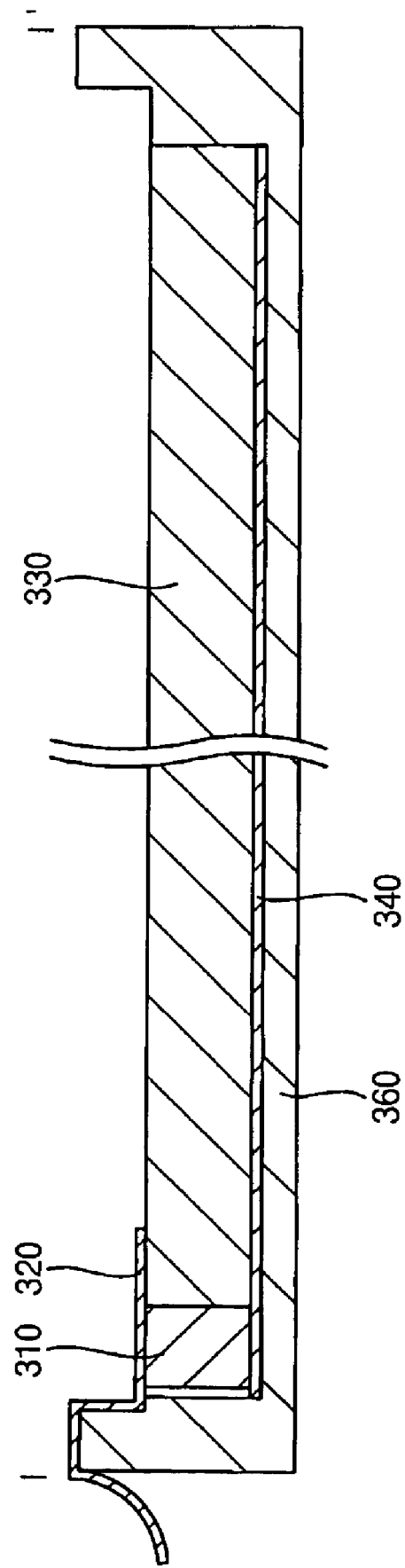
FIG. 7 is a cross-sectional view taken along the line I-I' in FIG. 6.

FIG. 6 is an exploded perspective view illustrating a backlight assembly 300 according to an embodiment of the present invention. FIG. 7 is a cross-sectional view taken along the line I-I' in FIG. 6.

The backlight assembly 300 shown in FIG. 6 has substantially the same structure as the backlight assembly 100 in FIG. 1 except for a position and shape of an inserting portion 333 formed at a light-guide plate 330.

Referring to FIGS. 6 and 7, the backlight assembly 300 includes a light source part 310, a PCB 320 and a light-guide plate 330. The light-guide plate 330 includes an inserting portion 333. A first side surface 336 of the light-guide plate 330 is recessed to form the inserting portion 333.

Although the first side surface 336 of the light-guide plate 330 can be recessed to form the inserting portion 333 in an embodiment of the present invention, a second side surface 337, a third side surface 338 or a fourth side surface 339 may be recessed to form the inserting portion 333 in alternate embodiments of the present invention.

The inserting portion 333 may penetrate a first surface 331 and a second surface 332 of the light-guide plate 330. A light-diffusing pattern for diffusing incident light may be formed at a side surface 334 of the inserting portion 333 that is substantially parallel with the first side surface 336 of the light-guide plate 330.

The light source part 310 emits light having a predetermined brightness and provides the light-guide plate 330 with the light. The light source part 310 includes a plurality of LEDs 311, 312 and 313. The LEDs 311, 312 and 313 are inserted into and are fixed to the light-guide plate 330. In an embodiment, the number of the inserting portions 333 is the same as that of the LEDs 311, 312 and 313 of the light source part 310.

The light source part 310 is attached to the PCB 320, for example, through a soldering process. A circuit pattern (not shown) providing a driving signal for driving the light source part 310 is formed at the PCB 320.

When the light source part 310 attached to the PCB 320 is inserted into the inserting portion 333 of the light guide-plate 330, the PCB 320 is fastened to the second surface 332 of the light guide-plate 330. Alternatively, the PCB 320 may be fastened to the first surface 331 of the light guide-plate 330.

The LEDs 311, 312 and 313 of the light source part 310 may not shift because the light source part 310 is inserted into and fixed to the light-guide plate 330. Therefore, a brightness deviation of the backlight assembly 300 may be reduced.

The backlight assembly 300 may further include a reflecting plate 340 disposed under the light-guide plate 330. The reflecting plate 340 reflects light leaking downward from the light-guide plate 330 and sends the light to the light-guide plate 330 to improve optical efficiency.

A reflecting plate 340 having a predetermined thickness is used in an embodiment described in connection with FIGS. 6 and 7. In another embodiment, a reflecting sheet having a form of a thin sheet may be employed instead of the reflecting plate 340.

The backlight assembly 300 may further include a receiving container 360 that receives the light source part 310, the PCB 320, the light-guide plate 330 and the reflecting plate 340.

Figure 8:
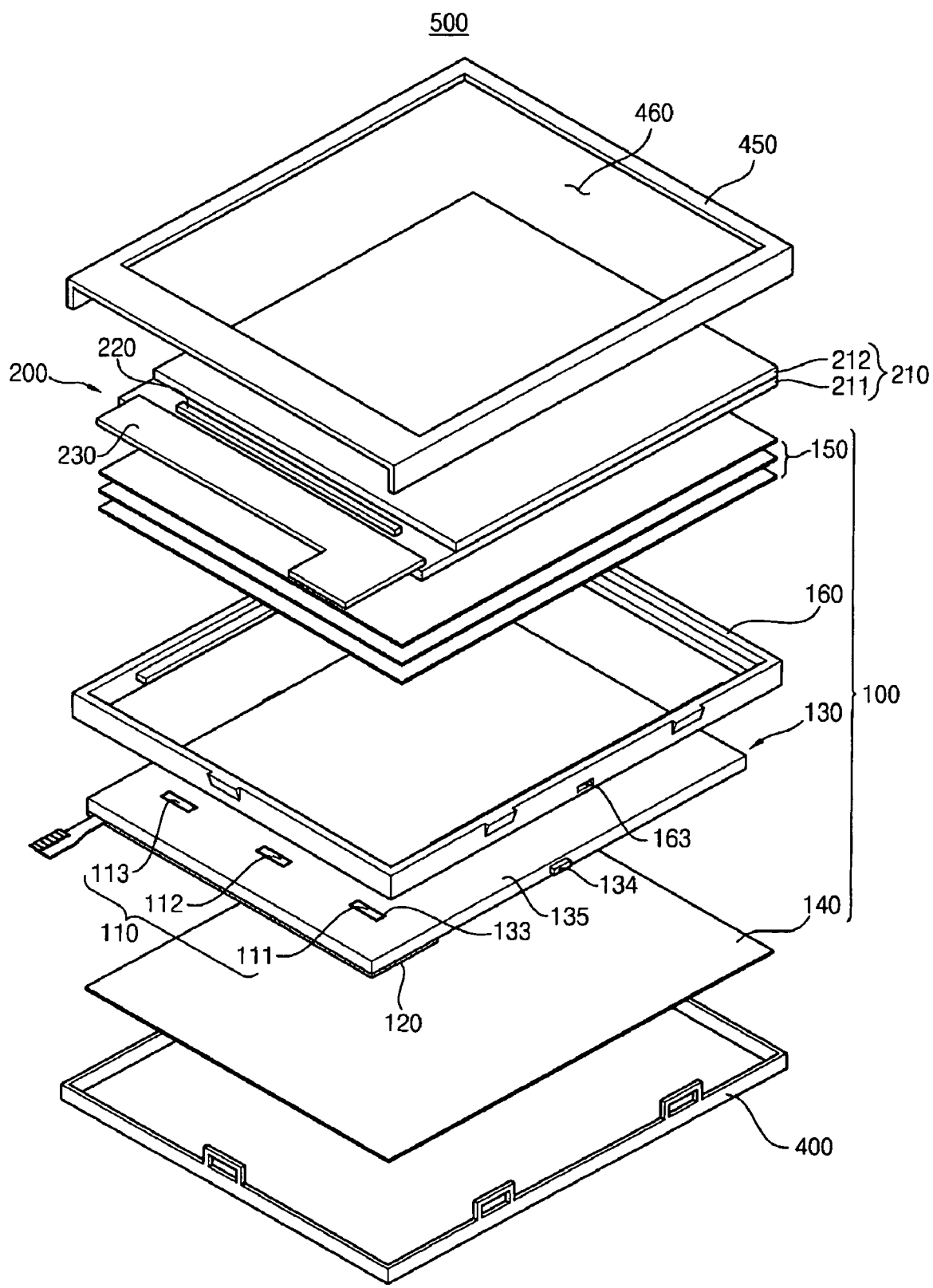
FIG. 8 is an exploded perspective view illustrating a liquid crystal display (LCD) device according to an embodiment of the present invention.

FIG. 8 is an exploded perspective view illustrating an LCD device according to an embodiment of the present invention.

Referring to FIG. 8, an LCD device 500 includes a backlight assembly 100, an LCD panel assembly 200, a second receiving container 400 and a top chassis 450.

The backlight assembly 100 has substantially the same structure as the backlight assembly 100 shown in FIGS. 1, 4 and 5.

The LCD panel assembly 200 includes an LCD panel 210, a driving chip 220 and a PCB 230.

The LCD panel 210 includes a thin-film transistor (hereinafter called 'TFT') substrate 211, a color filter substrate 212 facing the TFT substrate 211, and a liquid crystal layer (not shown) injected into between the TFT substrate 211 and the color filter substrate 212.

The TFT substrate 211 can be a transparent glass substrate on which a plurality of TFT (not shown) is arranged in a matrix form. A source terminal and a gate terminal of the TFT are electrically connected to a data line and a gate line, respectively. A drain terminal is electrically connected to a pixel electrode including a transparent and conductive material such as, for example, indium tin oxide (ITO), or indium zinc oxide (IZO).

The color filter substrate 212 is disposed separate from and opposite the TFT substrate 211. Red, green and blue color pixels for displaying predetermined colors are formed at the color filter substrate 212 by a thin-film processing. A common electrode is formed at a front side of the color filter substrate 212. The common electrode includes a conductive and transparent material such as, for example, ITO or IZO.

When the TFT turns on due to the voltage applied to the gate terminal of the TFT, an electric field is generated in between the pixel electrode and the common electrode. An alignment of liquid crystal molecules of the liquid crystal layer (not shown) interposed between the TFT substrate 211 and the color filter substrate 212 varies according to the electric field applied thereto, and then the transmittance of light exiting from the backlight assembly 100 varies accordingly. Therefore, the LCD panel 210 displays an image having predetermined gradations.

The driving chip 220 that applies a driving signal to the data and gate lines is mounted on a side of the TFT substrate 211.

In an embodiment, the driving chip 220 may include two or more chips. The two or more chips include a data driving chip providing the data line with a data signal and a gate driving chip providing the gate line with a gate signal. In another embodiment, the driving chip 220 may comprise one chip integrating the data driving chip and the gate driving chip. For example, the driving chip 220 is mounted on a side of the TFT substrate 211 by a chip-on-glass (COG) process.

The PCB 230 can be attached to a side of the TFT substrate 211, on which the driving chip 220 is mounted. The PCB 230 controls the driving chip 220 with a control signal.

The PCB 230 includes, for example, a timing controller (not shown) for controlling a predetermined time interval of the driving signal transmitted from the driving chip 220 to the LCD panel 210, and a memory (not shown) for saving the data signal. The PCB 230 may be electrically connected to the TFT substrate 211 through, for example, an anisotropic conductive film (ACF).

The second receiving container 400 is combined with the first receiving container 160 to prevent the reflecting plate 140 and the light-guide plate 130 from shifting. The second receiving container 400 and the first receiving container 160 receive the reflecting plate 140 and the light-guide plate 130. A plurality of optical sheets 150 and the LCD panel assembly 200 are received in the first receiving container 160. The PCB 230 included in the LCD panel assembly 200 can be folded along an outside surface of the second receiving container 400.

The top chassis 450 includes an opening 460 for exposing an effective displaying area of the LCD panel 210. The top chassis 450 covers an edge portion of the LCD panel assembly 200, and is combined with the second receiving container 400 to fix the LCD panel 210 to an upper part of the backlight assembly 100.

The top chassis 450 prevents the LCD panel assembly 200 from being broken by an external impact, and prevents the LCD panel assembly 200 from being separated from the backlight assembly 100.

According to embodiments of the present invention, a backlight assembly using a plurality of LEDs as a light source includes a light-guide plate having a plurality of inserting portions, and LEDs are inserted into the inserting portions to be fixed to the light-guide plate. Accordingly, light may not leak, and optical efficiency may be improved.

According to embodiments of the present invention, the inserting portions have a shape and size corresponding to the LEDs, and the light sources are fixed to the inserting portions, so that the light sources may not shift. Accordingly, a brightness deviation of the backlight assembly may be reduced.

According to embodiments of the present invention, the brightness deviation of the backlight assembly is reduced and the optical efficiency of the backlight assembly is improved, so that the quality of images that an LCD device displays may be improved.

Although exemplary embodiments of the present invention have been described with reference to the accompanying drawings, it is to be understood that the present invention should not be limited to these precise embodiments but various changes and modifications can be made by one skilled in the art without departing from the spirit and scope of the present invention as hereinafter claimed.

What is claimed is:

1. A backlight assembly comprising:
a light source generating light; and
a light-guide plate guiding the light, the light-guide plate including:
a light incident surface receiving the light from the light source, the light incident surface having a plurality of protruding portions and at least one recessed portion between the protruding portions, the light source being disposed adjacent to the recessed portion;
an upper surface emitting the received light from the light source; and
a lower surface fading the upper surface.

2. The backlight assembly of claim 1, wherein a top and bottom of the recessed portion are open.

3. The backlight assembly of claim 1, wherein the light incident surface of the light-guide includes a plurality of recessed portions, and the light source includes a plurality of light emitting diodes disposed on each of the recessed portions.

4. The backlight assembly of claim 3, further comprising a printed circuit board providing the light source with a driving signal to drive the light source, wherein the light source part is electrically connected to the printed circuit board.

5. The backlight assembly of claim 4, wherein a light-diffusing pattern is formed on the recessed portion to diffuse the incident light.

6. The backlight assembly of claim 5, further comprising a receiving container receiving the light source and the light-guide plate, wherein the receiving container is in contact with the protruding portions.

7. A liquid crystal display device comprising:
an liquid crystal display panel displaying an image;
a light source providing the liquid crystal display panel with light; and
a light-guide plate guiding the light, the light-guide plate including:
a light incident surface receiving the light from the light source, the light incident surface having a plurality of protruding portions and at least one recessed portion between the protruding portions, the light source being disposed adjacent to the recessed portion;
an upper surface emitting the received light from the light source; and
a lower surface facing the upper surface.

8. The liquid crystal display device of claim 7, wherein a top and bottom of the recessed portion of the light incident surface are open.

9. The liquid crystal display device of claim 7, wherein a light-diffusing pattern is formed on the recessed portion to diffuse the incident light.

10. The liquid crystal display device of claim 7, wherein the light incident surface of the light-guide plate includes a plurality of recessed portions, and the light source includes a plurality of light emitting diodes disposed on each of the recessed portions.

11. The liquid crystal display device of claim 10, further comprising a printed circuit board providing the light source with a driving signal to drive the light source, wherein the light source is electrically connected to the printed circuit board.

12. The liquid crystal display device of claim 11, wherein the printed circuit board is disposed at an end portion of the light-guide plate.

13. The liquid crystal display device of claim 10, further comprising a first receiving container receiving the light source and the light-guide plate, wherein the first receiving container is in contact with the protruding portions.

14. The liquid crystal display device of claim 13, wherein the light-guide plate further includes a fixing member, and the first receiving container further includes a fixing groove for receiving the fixing member.

15. The liquid crystal display device of claim 13, further comprising a second receiving container combined with the first receiving container, and a reflecting plate disposed between the light-guide plate and the second receiving container.

16. The liquid crystal display device of claim 15, further comprising a top chassis combined with the second receiving container to cover an edge portion of the liquid crystal display panel.

* * * * *